United States Patent
Jhumra et al.

(10) Patent No.: US 6,287,064 B1
(45) Date of Patent: Sep. 11, 2001

(54) CLIP TYPE FASTENER ASSEMBLY

(75) Inventors: Khusro M. Jhumra, Fullerton; Raymond C. Scherer, Fremont, both of CA (US); Larry E. Tarr, Medina, WA (US)

(73) Assignee: Western Sky Industries, Inc.

(*) Notice: Subject to any disclaimer, the term of this patent is extended or adjusted under 35 U.S.C. 154(b) by 0 days.

(21) Appl. No.: 09/458,283

(22) Filed: Dec. 10, 1999

(51) Int. Cl.$^7$ .......................... F16B 37/02; F16B 39/248
(52) U.S. Cl. .......................... 411/175; 411/112; 411/339; 411/903
(58) Field of Search .......................... 411/173–175, 182, 411/112, 902, 903, 338, 339

(56) References Cited

U.S. PATENT DOCUMENTS

| | | |
|---|---|---|
| 726,378 | 4/1903 | Tucker . |
| 1,031,410 | 7/1912 | Alexander . |
| 2,258,342 | 10/1941 | Tinnerman . |
| 2,274,014 | 2/1942 | Tinnerman . |
| 2,394,729 | 2/1946 | Tinnerman . |
| 2,552,499 | 5/1951 | Tinnerman . |
| 2,716,434 | 8/1955 | Crowther . |
| 3,033,624 | 5/1962 | Biesecker . |
| 3,096,678 * | 7/1963 | Devine ................................ 411/173 |
| 3,099,057 | 7/1963 | Cook . |
| 3,118,644 | 1/1964 | Wernig . |
| 3,193,335 | 7/1965 | Wing . |
| 3,247,752 | 4/1966 | Greenleaf et al. . |
| 3,361,459 | 1/1968 | Marquis et al. . |
| 3,385,158 | 5/1968 | Morin . |
| 3,438,686 | 4/1969 | Stone . |
| 3,768,115 | 10/1973 | Hoffmann et al. . |
| 3,829,184 | 8/1974 | Chevret . |
| 3,999,583 * | 12/1976 | Nelson ................................ 411/182 |
| 4,074,491 | 2/1978 | Bell et al. . |
| 4,100,368 | 7/1978 | Thomsen . |
| 4,219,064 | 8/1980 | Lozano . |
| 4,286,642 | 9/1981 | Keatley . |
| 4,363,580 | 12/1982 | Bell . |
| 4,376,605 | 3/1983 | Thomsen . |
| 4,445,594 | 5/1984 | Hoffman, Jr. . |
| 4,621,961 | 11/1986 | Gulistan . |
| 4,676,706 | 6/1987 | Inaba . |
| 4,761,860 * | 8/1988 | Krauss ................................ 411/339 |
| 4,890,966 * | 1/1990 | Umezawa ............................ 411/182 |
| 4,897,005 | 1/1990 | Peterson et al. . |
| 4,924,533 | 5/1990 | Stairs, Jr. . |
| 4,975,008 | 12/1990 | Wagner . |
| 5,018,920 | 5/1991 | Speakman . |
| 5,039,264 | 8/1991 | Benn . |
| 5,092,550 * | 3/1992 | Bettini ................................ 411/182 |
| 5,106,225 * | 4/1992 | Andre ................................ 411/182 |
| 5,599,148 | 2/1997 | Hirose . |
| 5,713,707 | 2/1998 | Gagnon . |
| 5,735,021 | 4/1998 | Briggs . |

* cited by examiner

*Primary Examiner*—Flemming Saether
(74) *Attorney, Agent, or Firm*—Harness, Dickey & Pierce, P.L.C (57) ABSTRACT

A clip type nut device for attachment about an aperture or opening of a support structure is provided with the clip nut device having a resilient main body member having a pair of transversely oppositely extending bushings at opposite ends of a flexible strap with a captured nut member in one bushing. One bushing has a first opening and is receivable within the support structure opening. The other or second bushing has a second opening with the threaded nut member captured in the second opening. A securing structure associated with the first and second bushing is operable to secure the first bushing to the second bushing with the first opening being aligned with the second opening such that the threaded nut member is aligned with the opening through the support structure.

33 Claims, 4 Drawing Sheets

CLIP TYPE FASTENER ASSEMBLY

SUMMARY BACKGROUND OF THE INVENTION

The present invention relates to clip type fastener assemblies which include a nut section on one end of a flexible strap or an arm which is self-securing to an opening or hole formed in a support structure to receive a bolt inserted through the hole and tightened into the nut section for fastening another member to the support structure.

Such fastening devices have been frequently referred to as clip nuts, clip-on nuts, etc. Clip nut devices are generally well known and include a nut section which can be positioned behind or underneath a panel or other similar flat surface to which another panel or other member is to be joined. Such clip nut devices usually include an arm which is resiliently movably connected to the nut section and is spaced in a preset position opposite the nut section by which the clip nut device can be resiliently clamped in place.

Clip nuts are commonly used in applications where access to either side of a panel or member will be limited for subsequent assembly of a related member so that manually holding a nut behind the hole or opening formed in the panel, or member is difficult or impossible. Clip nuts are also used where it is desired to provide self-retention of the nut which is alignable with an opening or hole such as a punched or drilled hole in the subject panel or member without resorting to riveting or other involved attachment means. Numerous applications for clip nuts are in the automotive, appliance, and aerospace industries.

Clip nuts have been frequently made of metal. Such metal clip nuts, when used for applications in areas exposed to significant moisture tend to cause galvanic corrosion around the area of application of the clip nut. Thus the metal clip nuts then are often plated with cadmium to reduce, but not eliminate, the likelihood of corrosion. In some cases lightweight, titanium clip nuts may be actually required in problem areas, but are more costly than cadmium-plated steel clip nuts. The high cost of the titanium clip nuts can present a significant cost problem for example, in the manufacture of aircraft since a great number of clip nuts, may be used on a single aircraft.

Efforts have been made to overcome various shortcomings of clip nuts. For instance, the Benn, U.S. Pat. No. 5,039,264 issued Aug. 13, 1991, describes a metal clip-on nut for enabling a panel to be secured to a metallic support structure with the clip-on nut being first resiliently secured to the support structure. The clip-on nut of the Benn patent has a portion for guiding the clip-on nut into an opening formed in the support structure with the guide portion contoured to avoid scratching and hence inducing corrosion of the engaged surface of the metal support structure. The Benn patent's clip-on nut, however, is constructed from a bendable steel material which while cadmium plated may still may be subject to corrosion as noted above.

Various clip type devices have been made in whole or in part of non-metallic, elastomeric materials. Such devices are shown in U.S. Pat. No. 4,100,368 issued Jul. 11, 1978 to Thomsen, U.S. Pat. No. 4,286,642 issued Sep. 1, 1981 to Keatly, U.S. Pat. No. 4,376,605 issued Mar. 15, 1983 to Thomsen and U.S. Pat. No. 5,599,148 issued Feb. 4, 1997 to Hirose. None of the above, however, show a device which can accommodate significant variations in the thickness of the panels to which they are to be secured. Also, none of the above devices including the '264 Benn patent appear to show a clip type device with a generally hole filling feature for resisting vibrational loads. In addition none show a device in which a metal nut member is substantially encapsulated in a plastic material.

Accordingly, it is desirable to have a clip nut type device which inhibits corrosion of the nut member and the surrounding support structure. Additionally, it is desirable to have a clip nut device which can be relatively inexpensive to manufacture and can be employed by the end user at a reasonable installation cost. Furthermore, it is desirable to have a clip nut device which securely maintains its relative position alignably with the hole or opening formed in the support structure for use in the subsequent assembly of another member to the support structure. In this regard it is desirable to have a clip nut device which locks to itself thereby assuring maintenance of its relative position alignably with the opening formed in the support structure to facilitate the subsequent assembly of the other member. It is also desirable to have a clip nut device which is not dimensionally sensitive and which can be locked onto panels or support members having a significant range of thicknesses.

The present invention is directed to a clip nut device for attachment in an aperture or opening of a support structure. The clip nut device comprises a resilient main body member having an elongated, resilient strap or connector with a first bushing projecting outwardly from one end of the strap and with a second bushing projecting outwardly in an opposite direction from the other end of the strap. The first bushing which is receivable within the structure opening or hole has a first through opening or bore. The second bushing has a second through opening but is not receivable within the structure opening or hole. A threaded nut member is supported at one end of the second opening of the second bushing. Securing means operatively associated with the first and second bushings secure the first bushing to the second bushing when the first bushing is moved partially into the second opening of the second bushing. In this manner the first opening or bore is aligned with the second opening such that the threaded nut member is aligned with the support structure opening or hole.

Here the threaded nut member, preferably, is of a metallic structure to provide adequate strength when engaged with a mating metal screw or bolt; however, the nut member is held and substantially encapsulated in the second bushing at one end of the second bore at a position spaced from engagement with the surface of the support structure to which it is to be preassembled thereby avoiding galvanic type corrosion.

In one form of the present invention, the first opening or bore of the first bushing is tapered on the inside surface such that upon moving of an associated screw or bolt through the first bore of the first bushing for engagement with the nut member, the first bushing will be flared radially outwardly to grippingly engage the support structure in or about the structure hole or opening to resist loosening from vibration.

In one form of the present invention, the securing means comprise elements formed on the outer surface of the first bushing and within the second opening, which are interengageable to secure the first bushing to the second bushing for attachment to support members having a range of thickness.

Thus it is an object of the present invention to provide a unique clip nut type device having a body member constructed substantially of an elastomeric material and a nut member for pre-assembly to a support structure with the nut member held in alignment with an aperture or opening in the support structure.

It is another object of the present invention to provide such a unique clip nut which can be used with support structures having a predetermined range of thicknesses.

It is still another object of the present invention to provide such a unique clip nut which provides filling of the aligned aperture or opening in the support structure upon engagement of a mating screw or bolt with the nut member in assembling another member to the support structure.

It is a general object of the present invention to provide a unique clip type fastener.

Other objects, features, and advantages of the present invention will become apparent from the subsequent description and the appended claims, taken in conjunction with the accompanying drawings, in which:

DETAILED DESCRIPTION OF THE EMBODIMENTS OF THE INVENTION

Figure 1:
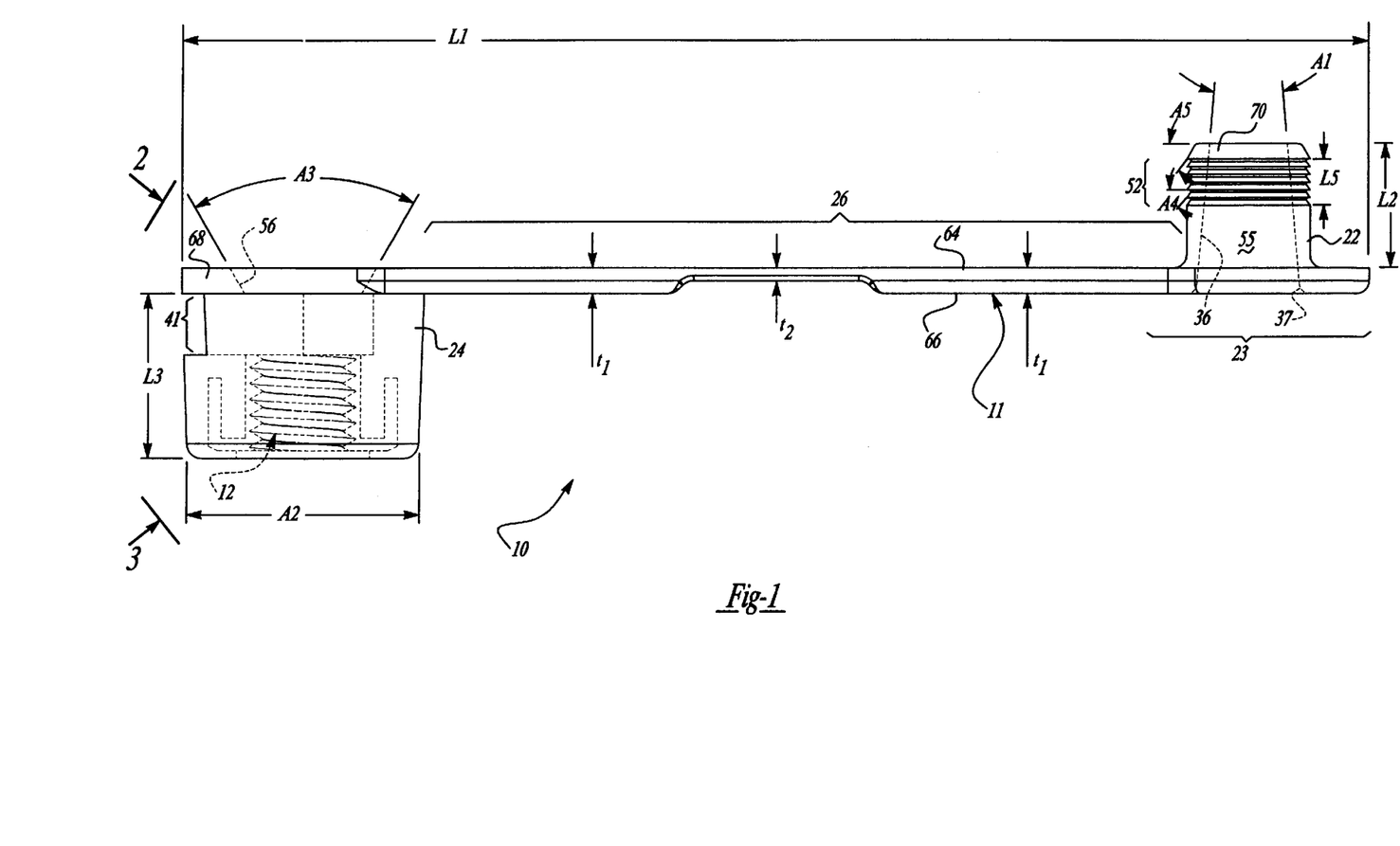
FIG. 1 is a side elevational view illustrating a clip nut device constructed in accordance with the present invention.
Figures 2, 3:
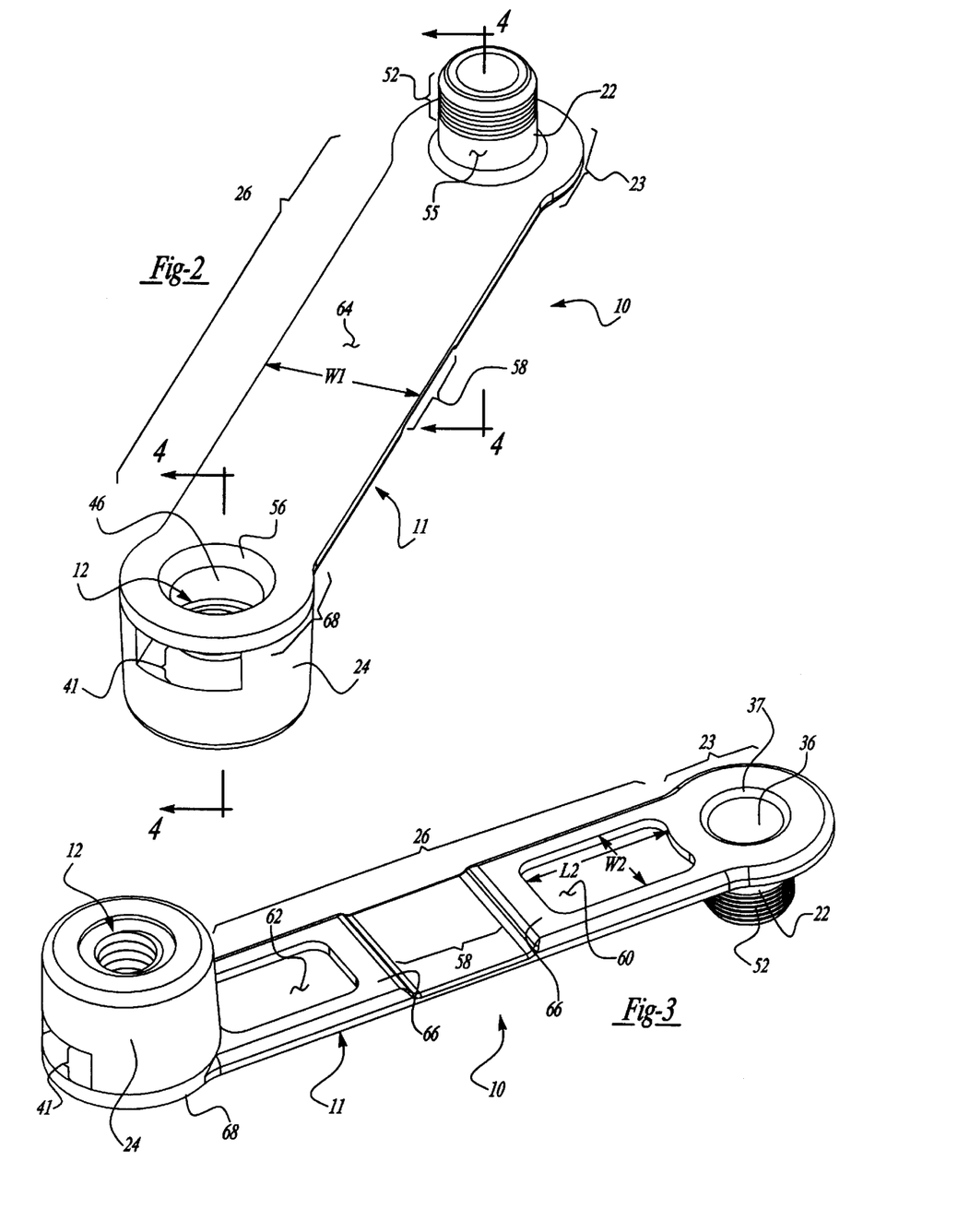
FIG. 2 is a pictorial view of the clip nut device of FIG. 1 taken generally in the direction of the Arrow 2 from the top of the clip nut device as shown in FIG. 1.
FIG. 3 is a pictorial view of the clip nut device of FIG. 1 taken generally in the direction of the Arrow 3 from the bottom of the clip nut device as shown in FIG. 1.
Figure 4:
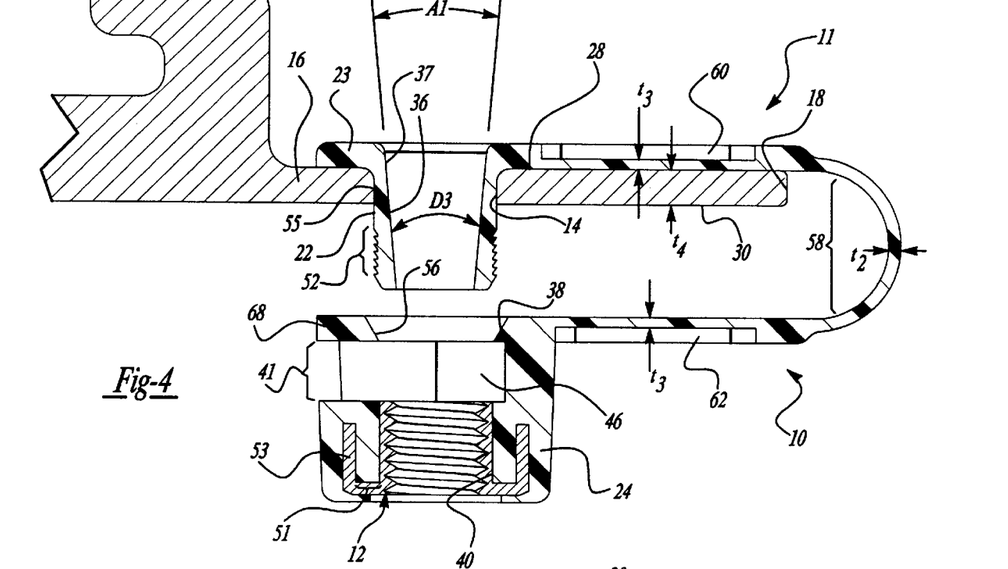
FIG. 4 is a side, elevational sectional view to enlarged scale of the clip nut device of FIGS. 1–3 taken generally along the lines 4—4 in FIG. 2 with the clip nut device shown preassembled to a support structure, partially shown and in section, with the clip nut device shown as partially folded during assembly to the support structure.
Figure 5:
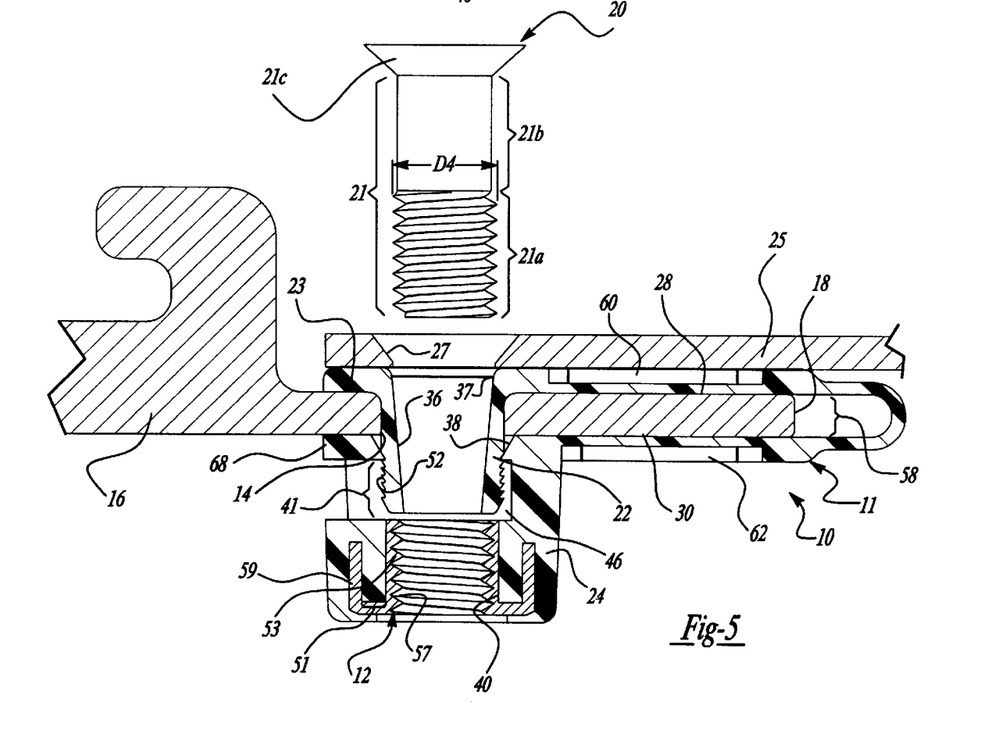
FIG. 5 is a sectional view similar to FIG. 4 with the clip nut device shown assembled to the support structure with a mating screw or bolt to be engaged for securing another member to the support structure.

Looking now to the drawings, a clip nut device 10 is shown and includes an elastomeric body member 11 with a threaded nut member 12 secured therein. As illustrated in FIGS. 4 and 5 the body member 11 is operative to align the nut member 12 with a hole or opening 14 in a support structure 16 which has generally planar upper and lower surfaces 28 and 30, respectively. The clip nut device 10 of the present invention retains the threaded nut member 12 in a preselected position adjacent an edge or end surface 18 of the support structure 16 and in line with the opening 14 for receiving the shank 21 of a screw or bolt 20 and guiding the threaded shank portion 21a for threaded engagement with the aligned nut member 12. The shank 21 has a smooth shank portion 21b which is connected to an enlarged countersunk or flush type head 21c.

The body member 11 of the clip nut device 10 of the present invention includes a first projecting member or bushing 22, a second projecting member or bushing 24, and an elongated resilient strap 26 connecting the first and second bushings 22 and 24. The bushings 22 and 24 are located at opposite ends of the strap 26 and extend transversely outwardly therefrom in opposite directions.

Preferably, the elastomeric body member 11 is unitarily formed in an integral, one-piece structure from an elastomeric material such as a nylon plastic material which is typically lighter and less expensive than a body member of a typical metal clip. As previously noted and as will be described below, the threaded nut member 12 is retained within the second bushing 24 for threadably receiving the threaded shank portion 21a of the screw or bolt 20 and is preferably a separate member formed from a metal material.

Figure 6:
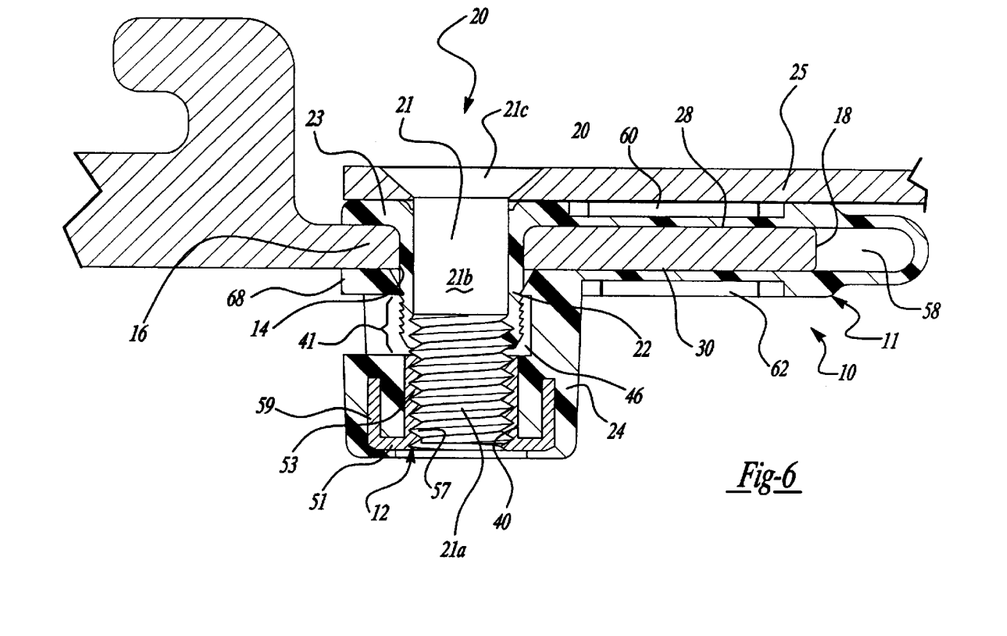
FIG. 6 is a sectional view similar to FIG. 5 upon completion of the assembly of the other member to the support structure.

The first bushing 22 is sized to be received within the hole or opening 14 of the support structure 16 with a close tolerance or slight interference fit. However, the elastic material of the body member 11 including the first bushing 22 facilitates its manual insertion without need for excessive force. The first bushing 22 has a tapered through bore 36 which is adapted to receive the shank 21 of the screw or bolt 20. The taper of the tapered bore 36 is selected to provide an interference fit with the shank 21 of the bolt 20 such that upon insertion of the bolt shank 21 therein, the first bushing 22 will be flared radially outwardly causing it to expand into engagement with the structure opening 14 thereby further securing the first bushing 22 within the structure opening 14 (see FIG. 6). Such compressive fit will inhibit loosening of the joint from vibrational loads. The first bushing 22 optionally could include one or more axially extending slits (not shown) along its axial length for promoting the flaring of the first bushing 22 upon insertion and tightening of the screw or bolt 20 therein, as illustrated in FIG. 6.

The first bushing 22 has an enlarged flange portion 23 in line with and in the same plane as the inner or upper surface 64 of the strap 26. The flange portion 23 will provide an increased bearing surface for engagement with the upper confronting surface 28 of the support structure 16 around the hole or opening 14. In this regard the tapered through bore 36 has an enlarged tapered portion 37 in the area of the flange portion 23 to provide clearance with the outer end of the bolt shank 21 to facilitate initial insertion and alignment of the bolt shank 21 in the through bore 36.

As noted the second bushing 24 extends transversely in a generally opposite direction from that of the first projecting bushing 22. A second through opening 46 extends through the second bushing 24. The second through opening 46 is of a stepped construction and includes a retention bore portion 38 located at one end of the second bushing 24 and a nut holding bore portion 40 at its opposite end separated by a radial slot 41 which is open at one side. The slot 41 is formed in molding of the opening 46 of the second bushing 24 and in this regard facilitates formation of a retention structure in the retention bore portion 38 and molding of the nut member 12 in the nut holding bore portion 40. As can be seen, the nut holding bore portion 40 substantially encapsulates the nut member 12. In this regard a nut member could be provided of a form to be ultrasonically welded within a nut holding bore portion 40.

Figure 7:
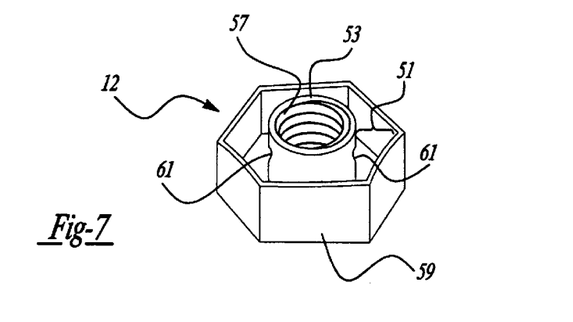
FIG. 7 is a pictorial view to enlarged scale of the nut member of the clip nut device.

As can be seen in FIG. 7, the nut member 12 includes a central, cylindrical portion 53 which has a threaded through bore 57. A generally cup shaped portion 51 has an outer circumferential flange 59 which extends radially outwardly and axially upwardly from the outer end of the central nut portion 53. The cup portion 51 with flange 59, being encapsulated in nut holding bore portion 40, holds the nut member 12 from axial movement within the nut holding bore portion 40 especially as the bolt 20 is fully torqued in the threaded bore 57. In addition the flange 59 is hexagonally shaped and in this way provides anti-rotation resistance to the nut member 12 while also helping to secure the nut member 12 within the bore portion 40 and bushing 24. It should be noted that the flange 59 could be provided with other non-uniform contours to resist rotation, i.e. serrations, etc. The threaded bore 57 of nut member 12 is adapted to matingly receive the threaded shank portion 21a of the screw or bolt 20 as it is inserted through the first tapered bore 36 with the taper assisting in holding the screw or bolt 20 within the first bushing 22. At the same time the cylindrical portion 53 is partially crimped radially inwardly below the outer end on diametrically opposite sides in an area 61 to provide a retention or prevailing torque feature with the engaged threads of the threaded bolt shank portion 21a.

The clip nut device 10 of the present invention further includes a securing structure for securing the first bushing 22 to the second bushing 24 while maintaining the threaded nut member 12 aligned with the structure hole or opening 14. The securing structure includes a plurality of axially spaced, annular barbs 52 formed on the outer surface of the first bushing 22 and extending along at least a portion of the length of the first bushing 22 at its outer end. The inner end 55 of the first bushing 22 is preferably smooth for movement into and/or in engagement with the structure hole or opening 14. The securing structure also includes a single annular protruding locking tooth or barb 56 formed at the radially inner end of the retention bore portion 38 in the second bushing 24.

The annular barbs 52 are designed to be ratcheted or snap fitted through the locking barb 56 in the retention bore portion 38 in the second bushing 24. The single locking barb 56 is adapted to catch the annular barbs 52 and to lockingly engage the last one ratcheted thereby securing the first bushing 22 to the second bushing 24. In this regard each of the plurality of barbs 52 is generally triangularly shaped with its outer or leading surface extending angularly to the axis of the first through bore 36 and with its inner or trailing surface extending transversely to the bore 36. At the same time the single barb or locking element 56 in the retention bore portion 38 is fully tapered to define a similar triangular shape and accordingly has its outer or leading surface extending angularly and its inner or trailing surface extending transversely to the axis of retention bore portion 38. Thus upon insertion of the first bushing 22 into the through opening 46 of the second bushing 24 the engagement of the leading angular surfaces of the plurality of barbs 52 with the leading angular surface of the single barb 56 will facilitate ratcheting of the barbs 52 past the locking element or barb 56. However, removal of first bushing 22 from the second bushing 24 will be resisted by the engagement of the transversely extending trailing surface of the adjacent one of the plurality of barbs 52 with the transverse trailing surface of the single barb 56. It should be noted that each of the plurality of barbs 52 can be separately operatively engaged with the single barb 56 to retain the first bushing 22 and second bushing 24 held together. Thus the plurality of barbs 52 in combination with the single barb 56 permit the clip nut device 10 to be used in support structures 16 varying in thickness with the grip or thickness range depending in part upon the axial length of the section with the plurality of barbs 52, i.e. including thicknesses greater than that shown in FIGS. 4 and 5. In this regard the noted barbed securing structure will also be effective in bringing the axis of the threaded nut bore 57 in line with the axis of the first, tapered opening or bore 36 to facilitate threaded engagement with the bolt shank 21.

The connecting section or strap 26, as discussed, extends between the first bushing 22 and the second bushing 24. The strap 26 includes a flexing portion 58 having a reduced thickness. The flexing portion 58 facilitates the localized bending of the strap 26 around the edge 18 of the support structure 16 to allow insertion of the first bushing 22 through the structure opening 14 and into the second through opening 46 of the second bushing 24 for securing at least a portion of the first bushing 22 therein.

Furthermore, the connecting section or strap 26 includes a first thinned portion 60 between the flexing portion 58 and the first bushing 22 and a second thinned portion 62 between the flexing portion 58 and the second bushing 24. The first and second thinned portions 60, 62 are generally defined by relatively wide, elongated grooves which reduce the weight of the clip nut device 10 while providing added flexibility to the strap 26. It should be noted, however, that the thinned portions 60, 62 are still somewhat less flexible than the thinner flexing portion 58 which thereby assists in promoting the localized bending of the strap 26 at the flexing portion 58 while facilitating alignment of the bushings 22 and 24 at opposite ends of the structure hole or opening 14. However, the thinned portions 60, 62 are still sufficiently resiliently flexible to accommodate angulation of the structure hole or opening 14 with the upper and lower structure surfaces 28 and 30.

In operation, as illustrated in FIG. 4, the first bushing 22 is located within the hole or opening 14 of the support structure 16 and is held there by a close tolerance or interference fit. It should be noted, however, that the clip nut device 10 could readily be used in applications having a clearance fit between the first bushing 22 and opening 14. Next, the connecting section or strap 26 of the clip nut device 10 is manipulated or bent via the flexing portion 58 about the edge 18 of the support structure 16 until the second bushing 24 is in line with the first bushing 22 and adjacent the opening 14 of the support structure 16. The bending occurs essentially at the flexing portion 58. Now the retention bore portion 38 of the second bushing 24 is moved axially over the outwardly projecting end of the first bushing 22 with the first set of barbs 52 being ratcheted over the locking element or barb 56 to secure the first bushing 22 to the second bushing 24 within the structure opening 14. In most instances preferably more than one of the barbs 52 can and will be ratcheted over the locking barb 56. Looking now to FIGS. 5 and 6, next a member 25 to be secured to the support structure 16 is moved over the strap 26 and has an opening 27 which is moved into alignment with the first through bore 36 in the first bushing 22. The shank 21 of the screw or bolt 20 is then inserted into the tapered first bore 36 to secure the member 25 to the support structure 16 with the tapered bore 36 facilitating aligned insertion. The outside diameter of the bolt shank 21 is of a larger diameter than at least a portion of the tapered bore 36 beginning around the structure opening 14. Thus as the shank 21 of bolt 20 is moved into the tapered bore 36 and the threaded shank portion 21a is threadably tightened into the nut member 12 the interference with the shank 21 causes at least a portion of the outer surface of the first projecting bushing 22 to flare generally radially outwardly into engagement with the surface around the opening 14 of the support structure 16 and also into the second through opening 46 of bushing 24 to thereby further secure the clip nut device 10 as well as the other member 25 to the support structure 16. The end portion of bushing 24 also defines an enlarged flange like portion 68 in line with and in the same plane as the upper surface 64 of the strap 26. The flange portion 68 will be moved into engagement with the lower surface 30 of the support structure 16 upon final installation and will thus provide increased bearing surface for engagement with the surface 30 and around the hole or opening 14.

It should be noted that inner surface 64 of the strap 26 and the enlarged flange portions 23 and 68 define a reasonably wide, flat continuous surface which assists in providing stabilized seating of the member 25 to both upper and lower support structure surfaces 28 and 30 when fastened to the support structure 16. This is also promoted by engagement of the wide inner surface 64 with the planar, confronting surfaces 28 and 30 of the support structure 16. In this regard the width of the strap 26 is preferably no less than around 80% of the diameter of the flange portions 23 and 68 and/or diameter of the second bushing 24. The enlarged flange portions 23 and 68 also provides an increased bearing surface around the hole or opening 27 of the member 25 being fastened to the support structure 16.

The clip nut device 10 of the present invention has many advantages over the devices of the prior art. For example, the clip nut device 10 is corrosion resistant which is especially useful in areas of high moisture content. In this regard the nut member 12 is substantially completely encapsulated within the second bushing 24 and at the same time is held at a spaced location relative to the support structure 16. Also in one form of the invention the nut member 12 which is generally of a known configuration is made of A286 steel which is a corrosion resistant material. Second, being constructed mostly of a plastic material, the clip device 10 exhibits significant weight reduction over prior art metal clip devices while resulting in cost savings. Also, the elastomeric body member 11 of the clip device 10 can be easily color-coded during fabrication for indicating different sizes of clip devices 10 thereby saving time in the selection and installation of the appropriate clip device 10. The clip device 10 also provides vibrational insulation and can provide electrical insulation between the support structure 16 and the member 25 being secured thereto. In addition, the clip device 10 can be manually removed, if necessary, by disengaging the bushings 22 and 24 after removal of the bolt 20 and cutting the strap 26. In addition the variable grip and engagement of the retention or securing structure permits use of the clip nut device 10 with support structures 16 having a range of thicknesses. Thus a single clip nut device 10 of the present invention can be used with a number of different support structures 16. In addition, the tapered bore 36 upon the radial expansion into engagement with or around the wall of the structure opening 14 during installation provides additional gripping and securement with the support structure 16 to resist vibrational and other loads.

It should be noted that it is within the scope of the present invention to vary the dimensions, structure and materials of the clip nut device 10 of the present invention depending on the desired application of the clip nut device 10. In one embodiment, the body member 11 of the clip nut device 10 was molded from a nylon plastic material and had a length L1 of approximately 2.335 inches and a width W1 of approximately 0.40 inches. In this regard the body member 11 could be injection molded from Zytel FR10 of a Nylon 6/6 family which is a flame retardant type. Furthermore the first bushing 22 had a projecting length L2 of approximately 0.243 inch and the second bushing 24 had a projecting length L3 of approximately 0.323 inch.

The diameter D1 of the first bushing 22 was 0.245 inch while the diameter D2 of the second bushing 24 was 0.475 inch. The tapered bore 36 in the first bushing 22 extended at an included angle A1 of 10° and had a diameter D3 varying from 0.155 inch to 0.206 inch. The bolt shank 21 had a maximum or crest diameter D4 of 0.187 inch. The outside surface of the second bushing 24 extended at an included angle A2 of 4°. The included angle A3 of the locking barb 56 was 60° while the angle A4 of the barbs 52 was around 54° with the lead in surface 70 being at an angle A5 of around 60°. The thickness t1 of the strap 26 between inner and outer surfaces 64 and 66 was 0.050 inch while the thickness t2 of the flexing portion 58 was 0.025 inch. The thickness t3 of the thinned portions 60, 62 was 0.030 inch with a width W2 of 0.250 inch and length L4 of 0.600 inch. The pitch P of the plurality of barbs 52 was 0.015 inch with there being six barbs 52 extending for an axial length L5 of 0.090 inch, which defines the thickness range for the clip nut device 10. The length L5 of the nut holding bore portion 40 was 0.203 inch while the length L6 of the slot 41 was 0.120 inch. The nut member 12 was made of A286 steel with the threaded bore 57 having a standard thread form of 0.1900-32 UNJF-3B. In the example noted the clip nut device 10 could be utilized with support structures 16 having a range of thickness t4 from 0.088 inch to 0.163 inch.

The foregoing exemplary descriptions and the illustrative preferred embodiments of the present invention have been explained in the drawings and described in detail, with varying modifications and alterative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A clip nut device for attachment about an opening in a support structure, the clip nut device comprising:

a body member constructed of a resilient material, and a threaded nut member constructs of a preselected metal, said resilient body member having a resilient, flexible longitudinally extending strap with a first end and a second end, a first projecting bushing extendire transversely from said first end of said strap, said first bushing having a first through opening and said first bushing being receivable within the structure opening with said first through opening axially aligned with the structure opening, a second projecting bushing extending transversely from the second end of said strap in a direction opposite from said first bushing, said second bushing having a second through opening;

said threaded nut member supported within said second opening of said second bushing at a position spaced from engagement with the support structure; and securing means associated with said first and second bushings and actuable for securing said first bushing to said second bushing upon movement of said first bushing into said second opening of said second bushing, upon securement of said second bushing with said first bushing said second through opening of said second bushing being axially aligned with the structure opening such that said threaded nut member is aligned with the structure opening, said securing means comprising a first securement structure on said first bushing and a second securement structure on said second bushing with said first and second securement structures adapted to be in securement engagement at a position substantially externally of the opening in the support structure.

2. The clip nut device of claim 1 with said securing means comprising annular elements formed on said first bushing and within said second opening and adapted to interengage to secure said first projecting bushing to said second projecting bushing to support structures varying in thickness.

3. The clip nut device of claim 1 with said securing means comprising a plurality of radially outwardly extending barbs formed on said first projecting bushing and a radially inwardly projecting locking element formed within said second opening, wherein said barbs and said locking element interact to secure said first projecting bushing to said second projecting bushing to support structures varying in thickness.

4. The clip nut device of claim 1 wherein said strap and said first and second projecting bushings are of a unitary, integral structure made of a resilient, elastomeric plastic material.

5. The clip nut device of claim 1 with said securing means comprising annular elements formed on said first bushing and within said second opening and adapted to interengage to secure said first projecting bushing to said second projecting bushing to support structures varying in thickness, and wherein said strap and said first and second projecting bushings are of a unitary, integral structure made of a resilient, elastomeric plastic material.

6. The clip nut device of claim 1 with said securing means comprising a plurality of radially outwardly extending barbs formed on said first projecting bushing and a radially inwardly projecting locking element formed within said second opening, wherein said barbs and said locking element interact to secure said first projecting bushing to said second projecting bushing to support structures varying in thickness, and wherein said strap and said first and second projecting bushings are of a unitary, integral structure made of a resilient, elastomeric plastic material.

7. The clip nut device of claim 1 with said nut member being substantially encapsulated in said second opening and at a position spaced from engagement with the confronting surface of the support structure.

8. The clip nut device of claim 1 with said strap and first bushing defining a planar outer surface for supporting a separate member to be secured to the support structure.

9. The clip nut device of claim 1 with said strap and first bushing defining a planar outer surface for supporting a separate member to be secured to the support structure in a spaced relationship from the support structure to substantially insulate the support structure from the secured member.

10. The clip nut device of claim 1 with said nut member being substantially encapsulated by the resilient material of said body member in said second bushing at said second opening and at a position spaced from engagement with the confronting surface of the support structure, said nut member including a central cylindrical portion with a threaded through bore and a generally cup shaped portion having an outer flange extending generally circumferentially about said cylindrical portion in a radially spaced relationship and with said resilient material located in the space between said flange and said cylindrical portion whereby said nut member is restrained from axial and rotational movement relative to said second bushing.

11. The clip nut device of claim 10 with said outer flange of said nut member having an irregular contour to inhibit rotation of said nut member relative to said second bushing in response to torsional force applied to said nut member by a mating threaded member.

12. A clip nut device for attachment about an opening in a support structure, the clip nut device comprising:
a body member constructed of a resilient material, and
a threaded nut member constructed of a preselected metal,
said resilient body member having a resilient, flexible longitudinally extending strap with a first end and a second end,
a first projecting bushing extending transversely from said first end of said strap, said first bushing having a first through opening and said first bushing being receivable within the structure opening with said first through opening axially aligned with the structure opening,
a second projecting bushing extending transversely from the second end of said strap in a direction opposite from said first bushing, said second bushing having a second through opening;
said threaded nut member supported within said second opening of said second bushing at a position spaced from engagement with the support structure; and
securing means associated with said first and second bushings and actuable for securing said first bushing to said second bushing upon movement of said first bushing into said second opening of said second bushing, upon securement of said second bushing with said first bushing said second through opening of said second bushing being axially aligned with the structure opening such that said threaded nut member is aligned with the structure opening,
said first opening of said first projecting bushing is tapered, wherein upon movement of a bolt shank within said first tapered opening said first bushing is flared radially outwardly into engagement with the support structure.

13. A clip nut device for attachment about an opening in a support structure, the dip nut device comprising:
a body member constructed of a resilient material, and
a threaded nut member constructed of a preselected metal,
said resilient body member having a resilient, flexible longitudinally extending strap with a first end and a second end,
a first projecting bushing extending transversely from said first end of said strap, said first bushing having a first through opening and said first bushing being receivable within the structure opening with said first through opening axially aligned with the structure opening,
a second projecting bushing extending transversely from the second end of said strap in a direction opposite from said first bushing, said second bushing having a second through opening;
said threaded nut member supported within said second opening of said second bushing at a position spaced from engagement with the support structure; and
securing means associated with said first and second bushings and actuable for securing said first bushing to said second bushing upon movement of said first bushing into said second opening of said second bushing, upon securement of said second bushing with said first bushing said second through opening of said second bushing being axially aligned with the structure opening such that said threaded nut member is aligned with the structure opening,
said first opening of said first projecting bushing is tapered, wherein upon movement of a bolt shank within said first tapered opening said first bushing is flared radially outwardly into engagement with the support structure, said securing means comprising annular elements formed on said first bushing and within said second opening and adapted to interengage to secure said first projecting bushing to said second projecting bushing to support structures varying in thickness, and wherein said strap and said first and second projecting bushings are of a unitary, integral structure made of a resilient, elastomeric plastic material.

14. A clip nut device for attachment about a structure aperture of a support structure, the clip nut device comprising:
- a resilient main body member having a first end and a second end;
- a first projecting member extending transversely at said first end of said main body member and receivable within the structure aperture;
- a first aperture formed through said first projecting member;
- a second projecting member extending transversely at said second end of said main body member in a direction opposite to that of said first projecting member;
- a second aperture formed in said second projecting member; and
- a threaded nut structure located within said second aperture of said second projecting member;
- a bolt member having a threaded shank adapted to extend through said first and second apertures and into threaded engagement with said nut structure,
    said first and second apertures and said bolt shank formed whereby upon movement of said bolt shank into said first aperture said first projecting member will flare radially outwardly about the structure aperture securing said first and second projecting members to the support structure.

15. The clip nut device of claim 14 with said nut member being substantially encapsulated in said second opening and at a position spaced from engagement with the confronting surface of the support structure.

16. The clip nut device of claim 14 with said main body member having a flexible strap portion extending between said first and second projecting members to facilitate bending of said main body member about opposite sides of the support structure to locate said first and second projecting members at opposite sides of the structure aperture.

17. The clip nut device of claim 16 with said strap and first bushing defining a planar outer surface for supporting a separate member to be secured to the support structure.

18. The clip nut device of claim 16 with said strap and first bushing defining a planar outer surface for supporting a separate member to be secured to the support structure in a spaced relationship from the support structure to substantially insulate the support structure from the secured member.

19. The clip nut device of claim 14 wherein said first aperture of said first projecting member is tapered to provide interference with said bolt shank whereby the radially outward flaring occurs.

20. The clip nut device of claim 14 further comprising securing means associated with said first projecting member and said second projecting member for securing said first projecting member to said second projecting member, the first aperture being aligned with the second aperture such that said threaded nut member is aligned with the structure aperture and with said securing means operable to secure said clip device to different support structures having a range of thickness.

21. The clip nut device of claim 14 further comprising securing means associated with said first projecting member and said second projecting member for securing said first projecting member to said second projecting member, said securing means comprising annular elements formed on said first projecting member and within said second aperture and adapted to interengage to secure said first projecting member to said second projecting member to support structures varying in thickness.

22. The clip nut device of claim 14 further comprising securing means associated with said first projecting member and said second projecting member for securing said first projecting member to said second projecting member, said securing means comprising a plurality of radially outwardly extending barbs formed on said first projecting member and a radially inwardly projecting locking element formed within said second aperture, wherein said barbs and said locking element interact to secure said first projecting member to said second projecting member to support structures varying in thickness.

23. The clip nut device of claim 14 wherein said nut structure is a nut member constructed of a preselected metal, and said strap and said first and second projecting members are of a unitary, integral structure made of a resilient, elastomeric plastic material.

24. The clip nut device of claim 23 with said nut member being substantially encapsulated by the resilient material of said body member in said second projecting member at said second aperture and at a position spaced from engagement with the confronting surface of the support structure, said nut member including a central cylindrical portion with a threaded through bore and a generally cup shaped portion having an outer flange extending generally circumferentially about said cylindrical portion in a radially spaced relationship and with said resilient material located in the space between said flange and said cylindrical portion whereby said nut member is restrained from axial and rotational movement relative to said second bushing.

25. The clip nut device of claim 24 with said outer flange of said nut member having an irregular contour to inhibit rotation of said nut member relative to said second projecting member in response to torsional force applied to said nut member by a mating threaded member.

26. The clip nut device of claim 14 further comprising securing means associated with said first protecting member and said second projecting member for securing said first projecting member to said second projecting member, said securing means comprising a plurality of radially outwardly extending barbs formed on said first projecting member and a radially inwardly projecting locking element formed within said second aperture, wherein said barbs and said locking element interact to secure said first projecting member to said second projecting member to support structures varying in thickness, and wherein said strap and said first and second projecting members are of a unitary, integral structure made of a resilient, elastomeric plastic material.

27. A clip nut device for attachment about an opening in a support structure, the clip nut device comprising:
- a body member constructed of a resilient material, and
- a threaded nut member constructed of a preselected metal,
    said resilient body member having a resilient, flexible longitudinally extending strap with a first end and a second end,
- a first projecting bushing extending transversely from said first end of said strap, said first bushing having a first through opening and said first bushing being receivable within the structure opening with said first through opening axially aligned with the structure opening,
- a second projecting bushing extending transversely from the second end of said strap in a direction opposite from said first bushing, said second bushing having a second through opening;
    said threaded nut member supported within said second opening of said second bushing at a position spaced from engagement with the support structure; and securing means associated with said first and second bushings and actuable for securing said first bushing to said second bushing upon movement of said first bushing into said second opening of said second bushing, said securing means comprising annular elements formed on said first projecting member and within said second aperture and adapted to interengage at a position substantially externally of the opening in the support structure to secure said first projecting member to said second projecting member to support structures varying in thickness.

28. The clip nut device of claim 27 with said securing means comprising a plurality of radially outwardly extending barbs formed on said first projecting member and a radially inwardly projecting locking element formed within said second aperture, wherein said barbs and said locking element interact to secure said first projecting member to said second projecting member to support structures varying in thickness.

29. The clip nut device of claim 27 with said nut member being substantially encapsulated in said second opening and at a position spaced from engagement with the confronting surface of the support structure.

30. The clip nut device of claim 27 with said strap and first bushing defining a planar outer surface for supporting a separate member to be secured to the support structure.

31. The clip nut device of claim 27 with said strap and first bushing defining a planar outer surface for supporting a separate member to be secured to the support structure in a spaced relationship from the support structure to substantially insulate the support structure from the secured member.

32. The clip nut device of claim 27 with said nut member being substantially encapsulated by the resilient material of said body member in said second bushing at said second opening and at a position spaced from engagement with the confronting surface of the support structure, said nut member including a central cylindrical portion with a threaded through bore and a generally cup shaped portion having an outer flange extending generally circumferentially about said cylindrical portion in a radially spaced relationship and with said resilient material located in the space between said flange and said cylindrical portion whereby said nut member is restrained from axial and rotation movement relative to said second bushing.

33. The clip nut device of claim 27 with said outer flange having an irregular contour to inhibit rotation of said nut member relative to said second bushing in response to torsional force applied to said nut member by a mating threaded member.

* * * * *

UNITED STATES PATENT AND TRADEMARK OFFICE
CERTIFICATE OF CORRECTION

PATENT NO.     : 6,287,064 B1  
DATED          : September 11, 2001  
INVENTOR(S)    : Khusro M. Jhumra et al.

Page 1 of 1

It is certified that error appears in the above-identified patent and that said Letters Patent is hereby corrected as shown below:

<u>Column 8, claim 1,</u>  
Line 36, delete "extendire" and substitute therefor -- extending --.

<u>Column 10, claim 13,</u>  
Line 27, delete "dip" and substitute therefor -- clip --.

<u>Column 12, claim 26,</u>  
Line 37, delete "protecting" and substitute therefor -- projecting --.

Signed and Sealed this

Ninth Day of April, 2002

*Attest:*

JAMES E. ROGAN  
*Attesting Officer*  *Director of the United States Patent and Trademark Office*

UNITED STATES PATENT AND TRADEMARK OFFICE
CERTIFICATE OF CORRECTION

PATENT NO. : 6,287,064 B1
DATED : September 11, 2001
INVENTOR(S) : Khusro M. Jhumra et al.

Page 1 of 1

It is certified that error appears in the above-identified patent and that said Letters Patent is hereby corrected as shown below:

<u>Column 8,</u>
Line 36, delete "extendire" and substitute therefor -- extending --.

<u>Column 10,</u>
Line 27, delete "dip" and substitute therefor -- clip --.

<u>Column 12,</u>
Line 37, delete "protecting" and substitute therefor -- projecting --.

Signed and Sealed this

Twelfth Day of August, 2002

JAMES E. ROGAN
*Director of the United States Patent and Trademark Office*